(12) United States Patent
Lee et al.

(10) Patent No.: US 10,074,835 B2
(45) Date of Patent: Sep. 11, 2018

(54) BATTERY PACK

(71) Applicant: LG CHEM, LTD., Seoul (KR)

(72) Inventors: Jong-Young Lee, Daejeon (KR); Gang-U Lee, Daejeon (KR); Dal-Mo Kang, Daejeon (KR); Jung-Min Park, Daejeon (KR); Jun-Yeob Seong, Daejeon (KR); Yong-Seok Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 101 days.

(21) Appl. No.: 15/124,799

(22) PCT Filed: Dec. 18, 2015

(86) PCT No.: PCT/KR2015/013978
§ 371 (c)(1),
(2) Date: Sep. 9, 2016

(87) PCT Pub. No.: WO2017/104878
PCT Pub. Date: Jun. 22, 2017

(65) Prior Publication Data
US 2017/0373289 A1    Dec. 28, 2017

(51) Int. Cl.
*H01M 2/00* (2006.01)
*H01M 2/10* (2006.01)
(Continued)

(52) U.S. Cl.
CPC .......... *H01M 2/1077* (2013.01); *B60L 11/18* (2013.01); *H01M 2/02* (2013.01); *H01M 2/10* (2013.01);
(Continued)

(58) Field of Classification Search
CPC ...................................................... H01M 2/00
See application file for complete search history.

(56) References Cited

U.S. PATENT DOCUMENTS

2005/0168918 A1    8/2005  Araki et al.
2013/0209850 A1    8/2013  Yokoyama et al.
(Continued)

FOREIGN PATENT DOCUMENTS

JP    2003-272974 A    9/2003
JP    2013-51099 A    3/2013
(Continued)

OTHER PUBLICATIONS

International Search Report issued in PCT/KR2015/013978 (PCT/ISA/210), dated Aug. 31, 2016.
(Continued)

*Primary Examiner* — Jacob B Marks
(74) *Attorney, Agent, or Firm* — Birch, Stewart, Kolasch & Birch, LLP

(57) ABSTRACT

Disclosed is a battery pack which has a simple structure, small volume and weight, and efficient cooling performance. The battery pack includes a module assembly including a plurality of secondary batteries, and a plurality of cartridges configured to be stacked with each other and surround an outer circumference of the secondary batteries at an outer side, the plurality of cartridges being at least partially made of thermally-conductive material; and a pack case having an empty space therein to accommodate the module assembly and at least partially made of thermally-conductive material to discharge heat of the module assembly.

14 Claims, 4 Drawing Sheets

(51) Int. Cl.

| | | |
|---|---|---|
| *B60L 11/18* | (2006.01) | |
| *H01M 2/02* | (2006.01) | |
| *H01M 10/613* | (2014.01) | |
| *H01M 10/653* | (2014.01) | |
| *H01M 10/6551* | (2014.01) | |
| *H01M 10/6554* | (2014.01) | |
| *H01M 10/6562* | (2014.01) | |
| *H01M 10/625* | (2014.01) | |

(52) U.S. Cl.
CPC ....... *H01M 10/613* (2015.04); *H01M 10/625* (2015.04); *H01M 10/653* (2015.04); *H01M 10/6551* (2015.04); *H01M 10/6554* (2015.04); *H01M 10/6562* (2015.04); *H01M 2220/20* (2013.01)

(56) References Cited

U.S. PATENT DOCUMENTS

| | | |
|---|---|---|
| 2014/0234691 A1 | 8/2014 | Lee et al. |
| 2014/0356660 A1 | 12/2014 | Inoue |
| 2015/0064540 A1 | 3/2015 | Roh et al. |
| 2016/0254505 A1 | 9/2016 | Eom et al. |

FOREIGN PATENT DOCUMENTS

| | | | |
|---|---|---|---|
| JP | 2013-191538 A | | 9/2013 |
| JP | 2014-235899 A | | 12/2014 |
| JP | 2014-534597 A | | 12/2014 |
| JP | 2015-520922 A | | 7/2015 |
| KR | 10-2012-0104840 A | | 9/2012 |
| KR | 1020120133655 | * | 12/2012 |
| KR | 10-1217608 B1 | | 1/2013 |
| KR | 10-2013-0073582 A | | 7/2013 |
| KR | 10-2015-0062800 A | | 6/2015 |
| KR | 10-2015-0118375 A | | 10/2015 |
| KR | 10-2015-0123102 A | | 11/2015 |

OTHER PUBLICATIONS

Written Opinion of the International Searching Authority issued in PCT/KR2015/013978 (PCT/ISA/237), dated Aug. 31, 2016.
Machine Translation of JP 2013-51099 A.

\* cited by examiner

BATTERY PACK

TECHNICAL FIELD

The present disclosure relates to a battery including at least one secondary battery, and more particularly, to a battery pack which has a simple structure, small volume and weight, and efficient cooling performance, and a vehicle including the battery pack.

BACKGROUND ART

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a positive electrode active material and negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior, namely a battery case, which seals and accommodates the electrode assembly together with an electrolyte.

Generally, a lithium secondary battery may be classified into a can-type secondary battery where the electrode assembly is included in a metal can and a pouch-type battery where the electrode assembly is included in a pouch of an aluminum laminate sheet, depending on the shape of the exterior.

Recently, secondary batteries are widely used not only for small-sized devices such as cellular phones but also middle-sized or large-sized devices such as vehicles and power storages. When being used for middle-sized or large-sized devices, a great number of secondary batteries are electrically connected to enhance capacity and output. In particular, in middle-sized or large-sized devices, pouch-type secondary batteries are frequently used since they can be easily stacked and have light weight.

Generally, in order to ensure cooling performance, various cooling methods such as direct or indirect water or air cooling are applied to a battery pack. In particular, in case of an existing battery pack, in order to remove heat emitted during a charging or discharging process, a plurality of cooling members made of metal material is disposed around a secondary battery, and a cooling medium such as air or water is supplied around the cooling member. For example, in an existing technique, in many cases, a metallic cooling member such as a cell cover or a cooling plate for the flow or thermal conduction of the cooling medium is interposed between secondary batteries.

However, in order to additionally provide such a cooling member near a plurality of secondary batteries or prepare a channel space for the flow of a cooling medium, the battery pack inevitably has an increased volume as a whole and also has a complicated structure. Therefore, the battery pack has deteriorated efficiency in fabrication, also has a limit in miniaturization, and also has an increased fabrication time and cost.

In addition, in an existing battery pack, a separate device such as fans or pumps is used for circulating the cooling medium, but this may increase fabrication time and costs and a volume of the battery pack, and the battery pack may have more complicated structure.

Further, if a cooling member made of electrically-conductive metal like an aluminum metal, insulation should be ensured between the cooling member and the secondary battery. Therefore, the battery pack may have more complicated structure due to a configuration for the insulation, and its volume and cost may also be increased.

DISCLOSURE

Technical Problem

The present disclosure is designed to solve the problems of the related art, and therefore the present disclosure is directed to providing a battery pack which may have a simple structure, be advantageous in miniaturization, reduce a fabrication cost and ensure efficient cooling performance by not including a cooling member, a cooling channel, a cooling circulating device or the like or by including a small number of cooling members, cooling channels, cooling circulating devices or the like, and a vehicle including the battery pack.

Other objects and advantages of the present disclosure will be understood from the following descriptions and become apparent by the embodiments of the present disclosure. In addition, it is understood that the objects and advantages of the present disclosure may be implemented by components defined in the appended claims or their combinations.

Technical Solution

In one aspect of the present disclosure, there is provided a battery pack, which includes a module assembly including a plurality of secondary batteries, and a plurality of cartridges configured to be stacked with each other and surround an outer circumference of the secondary batteries at an outer side, the plurality of cartridges being at least partially made of thermally-conductive material; and a pack case having an empty space therein to accommodate the module assembly and at least partially made of thermally-conductive material to discharge heat of the module assembly.

Here, the pack case may be made of metal material.

In addition, the pack case may be an aluminum die-casting product.

In addition, the module assembly may have upper and lower portions which come into contact with an inner side of the pack case.

In addition, the plurality of secondary batteries and the plurality of cartridges may be arranged and stacked in a horizontal direction in a state of standing in a vertical direction.

In addition, at least a part of the cartridge may include a thermally-conductive polymer or include a thermally-conductive material containing thermally-conductive filler and polymer.

In addition, at least a part of the secondary battery may be adhered to the cartridge by means of an adhesive.

In addition, the cartridge may have a tetragonal ring shape to accommodate the secondary battery in an inner space thereof, and at least a part of an outer circumference of the secondary battery may be adhered to an inner surface of the cartridge.

In addition, two different secondary batteries may be adhered to a single cartridge.

In addition, the cartridge may have a protrusion protruding inwards at an inner side thereof to be interposed between two secondary batteries, and the two secondary batteries may be adhered to the protrusion.

In addition, the protrusion may have inclined surfaces respectively formed at right and left sides thereto to have a width gradually decreasing in an inner direction.

In addition, the secondary battery may be adhered to the cartridge in a state where a sealing portion of the secondary battery is folded.

In addition, the adhesive may be a thermally-conductive adhesive.

In addition, the battery pack may further include a thermal pad interposed between the module assembly and the pack case.

In addition, the pack case may have an uneven portion formed at an outer surface thereof.

In another aspect of the present disclosure, there is also provided a vehicle, which includes the battery pack for a secondary battery according to the present disclosure.

Advantageous Effects

In an aspect of the present disclosure, it is possible to simplify the structure of a battery pack, reduce a size thereof and ensure efficient cooling performance.

Further, in an aspect of the present disclosure, since the cartridge is made of thermally-conductive material, heat of the secondary battery maybe discharged through the cartridge, and thus a cooling member such as a cooling plate or a cooling channel may not be provided in the battery pack, particularly between secondary batteries.

In addition, if a cooling member is not interposed between secondary batteries, it is not needed to provide any configuration for ensuring electrical insulation between the cooling member and the secondary battery.

In addition, in an aspect of the present disclosure, a cooling medium does not circulate in an inner space of the battery pack, but the heat generated from a module assembly is directly conducted to the pack case and emitted out of the battery pack. Therefore, it is not needed to provide any separate device or space for circulating a cooling medium, and the battery pack may be cooled by means of natural air circulation out of the battery pack.

Therefore, in this aspect of the present disclosure, it is possible to provide a battery pack which may ensure excellent cooling performance, easily have a compact design, be excellent in assembling and processing, and reduce fabrication time and costs.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
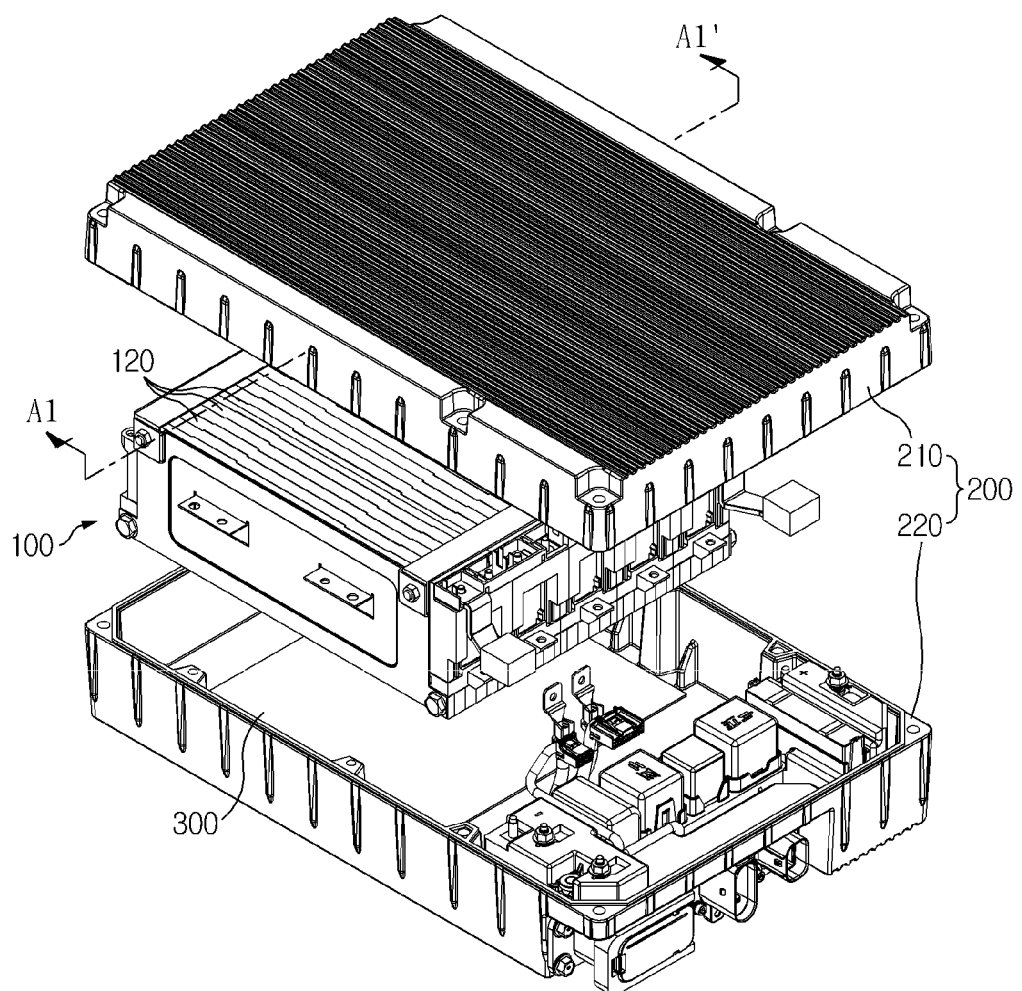
FIG. 1 is an exploded perspective view schematically showing a battery pack according to an embodiment of the present disclosure.

FIG. 1 is an exploded perspective view schematically showing a battery pack according to an embodiment of the present disclosure. In addition, FIG. 2 is a cross-sectional view, taken along the line A1-A1' of FIG. 1.

Figure 2:
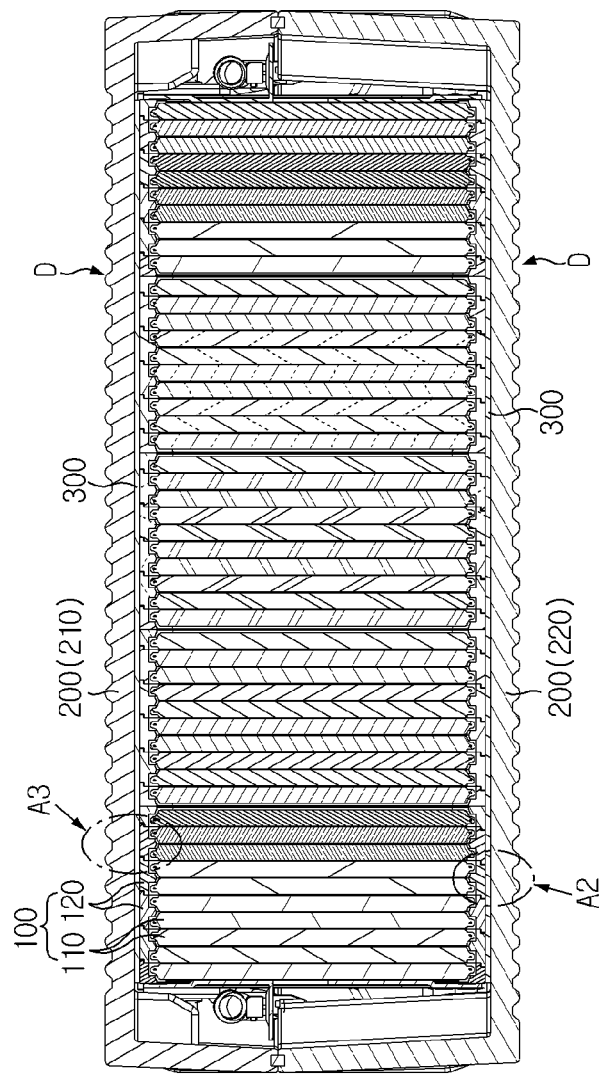
FIG. 2 is a cross-sectional view, taken along the line A1-A1' of FIG. 1.

Referring to FIGS. 1 and 2, the battery pack according to the present disclosure may include a module assembly 100 and a pack case 200.

The module assembly 100 may include a secondary battery 110 and a cartridge 120.

Here, a plurality of secondary batteries 110 may be provided in a single module assembly 100. In particular, each of the plurality of secondary batteries 110 may be configured with a pouch-type secondary battery. The pouch-type secondary battery may include an electrode assembly, an electrolyte and a pouch exterior.

Here, the electrode assembly may be configured so that at least one positive electrode plate and at least one negative electrode plate are arranged with a separator being interposed therebetween. In more detail, the electrode assembly may be classified into a winding-type electrode assembly in which a single positive electrode plate and a single negative electrode plate are wound together with a separator, and a stacking-type electrode assembly in which a plurality of positive electrode plates and a plurality of negative electrode plates are alternately stacked with a separator being interposed therebetween.

In addition, the pouch exterior may be configured to have an outer insulation layer, a metal layer and an inner adhesive layer. The pouch exterior may be configured to include a metal film, for example an aluminum film, to protect internal components such as an electrode assembly and an electrolyte, supplement electrical and chemical properties of the electrode assembly and the electrolyte, and enhance heat dissipation. In addition, the aluminum film may be interposed in the insulation layer made of insulating material in order to ensure electric insulation from internal components of the secondary battery 110 such as an electrode assembly and an electrolyte and other components out of the secondary battery 110.

In particular, the pouch exterior may be configured with two pouches, at least one of which may have an inner space with a concave shape. In addition, the electrode assembly may be accommodated in the inner space of the pouch. In addition, sealing portions may be provided at the outer circumference of two pouches so that the sealing portions are thermally fused to seal the inner space in which the electrode assembly is accommodated.

Meanwhile, an electrode tab may be provided to each electrode plate of the electrode assembly, and at least one electrode tab may be connected to an electrode lead. Moreover, the electrode lead may be interposed between sealing portions of two pouches and exposed out of the pouch exteriors, thereby serving as an electrode terminal of the secondary battery 110.

The module assembly 100 according to an embodiment of the present disclosure may adopt various kinds of pouch-type secondary batteries known to the public at the time of filing of the present disclosure.

The cartridge 120 accommodates the secondary battery 110 in an inner space thereof, and may be configured to surround the outer circumference of the secondary battery 110 at an outer side.

For example, the cartridge 120 may have approximately a tetragonal ring shape. In this case, the cartridge 120 may be configured with four unit frames with both ends connected to each other. At this time, each unit frame of the cartridge 120 may be designated as an upper unit frame, a lower unit frame, a front unit frame and a rear unit frame depending on its location. The unit frames of the cartridge 120 may be separately fabricated and then assembled to each other or may be integrally formed from the first.

In particular, the pouch-type secondary battery 110 may have an approximately tetragonal shape. Therefore, if the cartridge 120 is formed with a tetragonal ring shape as in this embodiment, the secondary battery 110 may be located at a central empty space to surround a rim portion of the secondary battery 110 at an outer side. Therefore, the cartridge 120 may accommodate the secondary battery 110 and protect an outer side of the secondary battery 110.

In addition, the cartridges 120 may be configured to be stacked with each other. For example, as shown in FIG. 2, the cartridges 120 may be stacked with each other in a lateral direction. At this time, the cartridges 120 may have uneven structures formed at their stacking surfaces, namely right and left surfaces thereof, to have corresponding shapes. In this embodiment of the present disclosure, the uneven structures formed at the cartridges 120 may improve a coupling force and a fixing force between the cartridges 120, and the uneven structures may play a role of guide to facilitate easier assembling.

As described above, the cartridges 120 may accommodate the pouch-type secondary batteries 110 in the inner spaces thereof to protect the outer side of the pouch-type secondary batteries 110, guides the arrangement of the pouch-type secondary batteries 110, and prevent the stacked assemblies from being shaken.

In addition, the cartridge 120 may be made of thermally-conductive material. A cartridge included in an existing battery pack is generally made of polymer material without thermal conduction, and thus thermal conduction is substantially not performed through the cartridge. Therefore, a battery pack using such a cartridge generally includes a cooling member and a cooling channel separately between secondary batteries. However, if the cartridge 120 is made of thermally-conductive material as in the present disclosure, since the cartridge is at least partially made of thermally-conductive material from its inner side to its outer side, heat of the secondary battery 110 may be easily transferred out of the cartridge 120 through the thermally-conductive material portion of the cartridge 120. Therefore, in the embodiment of the present disclosure, effective cooling performance may be ensured though a cooling member is not separately provided between secondary batteries 110.

In particular, at least a part of the cartridge 120 may made of a thermally-conductive material containing a thermally-conductive polymer or may be made of a thermally-conductive material containing thermally-conductive filler and polymer.

In other words, the cartridge 120 may be made using a polymer as a main material, instead of general metal or metal alloy. The polymer-based thermally-conductive material is lighter than metal, which allows the battery module to easily have a lighter design, ensures easy molding, low thermal expansion coefficient and low electric conduction, which leads to better electric insulation. In the present disclosure, the material of the cartridge 120 may adopt various kinds of polymer-based thermally-conductive materials known to the public at the time of filing of the present disclosure.

For example, the cartridge 120 may be made of a composite material in which a general polymer is mixed with thermally-conductive fillers. Here, the filler may include silicon compound, aluminum compound, magnesium compound, boron compound or the like. For example, the filler included in the thermally-conductive material may employ silicon oxide, aluminum oxide, boron nitride, aluminum nitride, magnesium oxide, anhydrous magnesium carbonate, magnesium hydroxide or the like. However, the present disclosure is not limited thereto, and various thermally-conductive fillers other than the above may also be used as a material of the cartridge 120.

The polymer used in the cartridge 120 may include various materials such as polypropylene, acrylonitrile butadiene styrene, polycarbonate, nylon, liquid crystal polymer, polyphenylene sulfide, polyetherether ketone or the like. In addition, various polymer materials other than the above may also be used as a material of the cartridge 120 of the present disclosure.

In particular, the thermally-conductive material of the cartridge 120 may have heat conductivity of 1 W/mK or above. For example, this thermally-conductive material may be polymer plastic or rubber with 2 W/mK to 20 W/mK. Further, the thermally-conductive material may be material with 5 W/mK or above.

In an existing technique, plastic used as a material of a cartridge generally has thermal conductivity of just 0.1 W/mK to 0.4 W/mK, which may be regard as an insignificant amount. However, since the cartridge 120 according to the present disclosure uses a polymer material having higher thermal conductivity, the cartridge 120 may allow heat transfer and emission. Therefore, in this embodiment of the present disclosure, even though a cooling member such as a metallic cooling plate is not separately provided in the cartridge, heat of the secondary battery 110 may be effectively emitted to the outside through the cartridge 120.

Meanwhile, the module assembly 100 may include at least one unit battery module. For example, as shown in FIG. 2, the module assembly 100 may include five unit battery modules, and each unit battery module may include a plurality of secondary batteries 110 and a plurality of cartridges 120 arranged in parallel in a horizontal direction. At this time, the cartridge 120 may be configured to be coupled to each unit battery module.

The pack case 200 may have an empty space therein to accommodate the module assembly 100. For example, as shown in FIG. 1, the pack case 200 may include an upper case 210 and a lower case 220. In this case, the module assembly 100 may be accommodated in the inner space of the lower case 220 and the upper case 210, and the lower case 220 and the upper case 210 may be coupled to each other to configure the pack case 200. Here, the lower case 220 and the upper case 210 may be coupled and fixed to each other in various ways such as bolt coupling or hook coupling.

In particular, at least a part of the pack case 200 may be made of thermally-conductive material. In addition, with this configuration, the pack case 200 may discharge heat of the module assembly 100 directly out of the battery pack. In other words, the pack case 200 may discharge heat of a main body made of thermally-conductive material, even though a configuration for discharging an internal heat to the outside, for example a pipe, a duct or the like for allowing a cooling medium to flow in or out, is not provided. Therefore, the battery pack according to the present disclosure may accomplish a passive cooling configuration using natural air circulation out of the battery pack.

For this reason, in this configuration of the present disclosure, it is possible to simplify a structure of the battery pack, reduce fabrication time and costs, and decrease a volume of the battery pack.

Preferably, the pack case 200 may be made of metal material. Metal has excellent thermal conductivity and also solid. Therefore, in this configuration of the present disclosure, the heat of the module assembly 100 may be easily discharged out through the pack case 200, and components such as the secondary battery 110 accommodated therein may be effectively protected against external impacts or the like. In particular, if the battery pack according to the present disclosure is mounted to an electric vehicle or the like, the pack case 200 may be configured to be directly exposed outwards without any additional component.

More preferably, the pack case 200 may be an aluminum die-casting product. In this configuration of the present disclosure, since the pack case 200 is made of aluminum material, it is possible to ensure excellent thermal conductivity and light weight. Further, if the pack case 200 is fabricated by means of die-casting, it is possible to ensure excellent productivity and precision and obtain a smooth surface, which may allow better contact with the module assembly 100 and thus lower heat resistance at a contact portion between the module assembly 100 and the pack case 200.

In particular, the pack case 200 may be made of the same thermally-conductive material, for example the same aluminum or aluminum alloy, as a whole.

Also preferably, when the module assembly 100 is accommodated in the pack case 200, at least a part of the module assembly 100 may contact an inner side of the pack case 200. In particular, at least one of upper and lower portions of the module assembly 100 may contact the inner side of the pack case 200.

For example, as shown in FIG. 2, the module assembly 100 may be configured so that its lower portion contacts the upper surface of the lower case 220 and its upper portion contacts the lower surface of the upper case 210.

In this configuration of the present disclosure, the heat of the module assembly 100 may be directly conducted to the pack case 200 through a contact portion between the module assembly 100 and the pack case 200. Therefore, in this configuration of the present disclosure, since an air layer is not interposed in such a heat transfer path between the module assembly 100 and the pack case 200, the heat of the module assembly 100 may be effectively transferred to the pack case 200 to improve cooling performance of the battery pack.

Also preferably, a plurality of secondary batteries 110 may be arranged and stacked in a horizontal direction in a state of standing in a vertical direction. For example, as shown in FIG. 2, the plurality of pouch-type secondary batteries 110 may be arranged in a horizontal direction in a state of standing in a vertical direction so that their broad surfaces are toward right and left sides.

In other words, in the module assembly 100 of the battery pack according to the present disclosure, the pouch-type secondary battery 110 may be configured to stand so that two broad surfaces thereof are toward right and left sides, respectively, and sealing portions are provided at upper, lower, front and rear sides thereof. In addition, the pouch-type secondary batteries 110 in a standing state as described above may be arranged in parallel in a lateral direction so that their broad surfaces face each other.

In addition, a plurality of cartridges 120 may also be arranged in a horizontal direction in a state of standing in a vertical direction, similar to the arrangement of the secondary batteries 110. In other words, as shown in FIG. 2, the cartridges 120 may be stacked in a lateral direction to maintain the secondary batteries 110 arranged in a lateral direction, and also cover outer sides of the secondary batteries 110.

In this configuration of the present disclosure, all cartridges 120 may come into direct contact with the pack case 200. Therefore, the heat of all secondary batteries 110 provided at the cartridges 120 may be uniformly transferred to the pack case 200. In other words, in this configuration of the present disclosure, the heat of all secondary batteries 110 may be directly transferred to the pack case 200 through the cartridges 120. Therefore, even though the module assembly 100 includes a plurality of secondary batteries 110, it is possible to prevent heat emission deviation from occurring at the secondary batteries 110.

Also preferably, in the battery pack according to the present disclosure, at least a part of the secondary battery 110 may be adhered and fixed to the cartridge 120 by means of an adhesive.

In this configuration of the present disclosure, since the secondary battery 110 does not move in the inner space of the cartridge 120 due to the adhesive, it is possible to prevent coupling between an electrode lead and a bus bar from being disconnected due to shaking of the secondary battery 110 when an external impact is applied thereto.

Further, in the battery pack according to the present disclosure, since the cartridge 120 is made of thermally-conductive material to transfer the heat of the secondary battery 110 to the cartridge 120, and at this time, since the adhesive is interposed between the secondary battery 110 and the cartridge 120, an air layer may not, or substantially not, exist between them. Therefore, it is possible to prevent that the heat transfer efficiency between the secondary battery 110 and the cartridge 120 is deteriorated due to heat resistance by such an air layer.

In particular, the cartridge 120 may be formed with a tetragonal ring shape to accommodate the secondary battery 110 in a central empty space, namely an inner space thereof, and at this time, at least a part of the outer circumference of the secondary battery 110 may be adhered to the inner surface of the cartridge 120. This will be described in more detail with reference to FIGS. 3 and 4.

Figure 3:
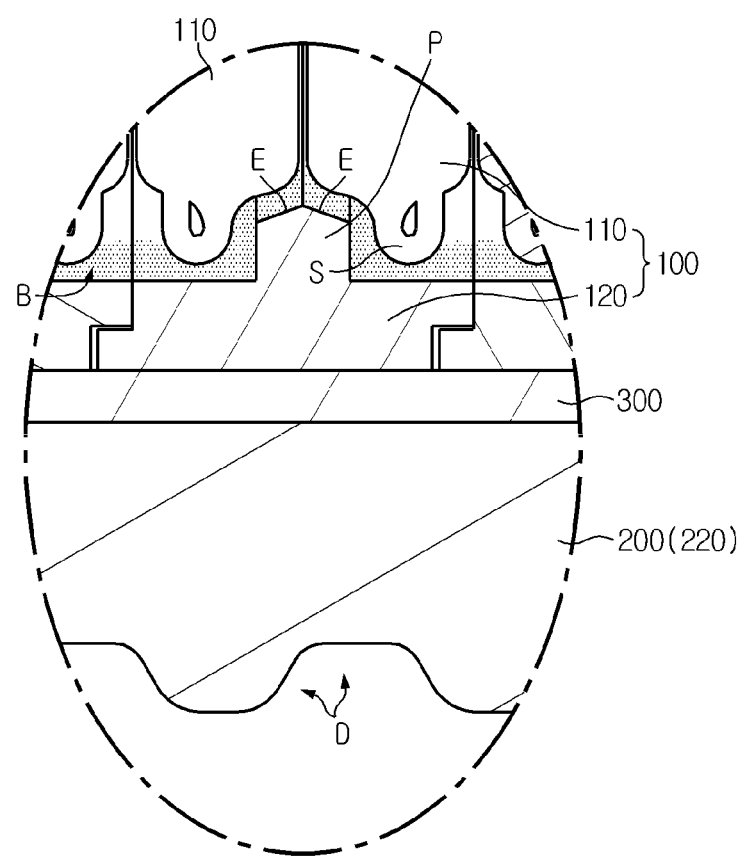
FIG. 3 is an enlarged view showing portion A2 of FIG. 2.
Figure 4:
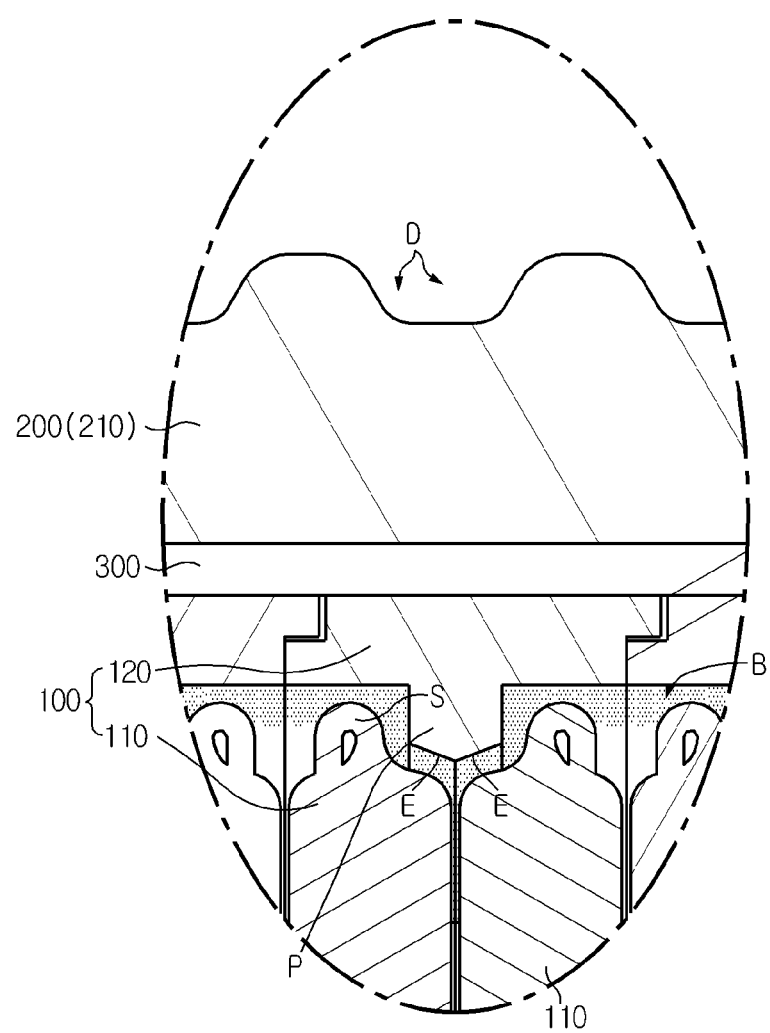
FIG. 4 is an enlarged view showing portion A3 of FIG. 2.

FIGS. 3 and 4 are enlarged views showing portions A2 and A3 of FIG. 2. In more detail, FIG. 3 shows a part of a lower configuration of the battery pack, and FIG. 4 shows a part of an upper configuration of the battery pack. In other words, FIG. 3 depicts a lower portion of the secondary battery 110, the lower unit frame of the cartridge 120, and the lower case 220, and FIG. 4 depicts an upper portion of the secondary battery 110, the upper unit frame of the cartridge 120, and the upper case 210.

First, referring to FIG. 3, when the secondary battery 110 is disposed to stand vertically on the ground, an outer circumference of the secondary battery 110, namely a sealing portion S, may be located at a lower portion. In addition, an adhesive B may be interposed between the sealing portion S of the secondary battery 110 and the lower unit frame so that the lower portion of the secondary battery 110 may be adhered to the cartridge 120.

In addition, referring to FIG. 4, a sealing portion S of the secondary battery 110 may also be located at a lower portion of the secondary battery 110. In addition, an adhesive B may be interposed between the sealing portion of the secondary battery 110 and the upper unit frame. Therefore, in this case, the upper portion of the secondary battery 110 and the cartridge 120 may be adhered to each other by means of the adhesive.

As described above, when being accommodated in the cartridge 120, the upper and lower outer circumferences of the pouch-type secondary battery 110 may be respectively adhered to the cartridge 120.

In particular, the pouch-type secondary battery 110 may have a rectangular shape, and at this time, the outer circumference of the pouch-type secondary battery 110 may be regarded as having two long sides and two short sides. In this case, the pouch-type secondary battery 110 may be disposed so that two long sides of the pouch-type secondary battery 110 are located at upper and lower sides, and two short sides are located at front and rear sides. In addition, two long sides of the pouch-type secondary battery 110 may be adhered to the cartridge 120 by means of an adhesive.

In this embodiment of the present disclosure, since the long sides of the outer circumference of the secondary battery 110 are adhered to the cartridge 120, the adhesive force may be further improved. Further, since an electrode lead may protrude on the short side of the pouch-type secondary battery 110, the adhesive may be more advantageously applied to the long sides, rather than the short sides, in aspect of reinforcement of a fixing force and processing efficiency.

Meanwhile, the cartridge 120 may accommodate at least one secondary battery 110. In particular, as shown in FIGS. 2 to 4, the cartridge 120 may accommodate two secondary batteries 110 in the inner space. At this time, the cartridge 120 may be configured so that two different secondary batteries 110 may be adhered to a single cartridge 120.

For example, referring to FIG. 3, lower portions of two adjacent secondary batteries 110 may set at the lower portion of the single cartridge 120. In addition, the lower portions of two secondary batteries 110 may be adhered to the same cartridge 120 by means of the adhesive B. Similarly, referring to FIG. 4, upper portions of two adjacent secondary batteries 110 may be adhered to an upper portion of the single cartridge 120.

In this configuration of the present disclosure, since two secondary batteries 110 are adhered to each cartridge 120, the cartridge 120 may be stacked more easily, and it is possible to more securely prevent the secondary batteries 110 from being shaken just by coupling the cartridges 120 to each other. In particular, as shown in the figures, the cartridges 120 may have uneven structures to be stacked with each other, and if the cartridges 120 are stacked by coupling such uneven structures, the secondary batteries 110 may be naturally stacked. Thus, it is possible to reduce inconvenience caused by stacking secondary batteries 110 while stacking cartridges 120 separately. Moreover, by reducing an interval between adjacent secondary batteries 110, it is possible to reduce a volume of the battery pack.

In this configuration, the cartridge 120 may have a protrusion formed at an inner side thereof to protrude inwards. In addition, two secondary batteries 110 may be adhered to the protrusion together.

For example, with reference to FIG. 3, the cartridge 120 may have a protrusion P formed at a center portion of the upper surface of the lower unit frame to protrude upwards. In addition, the protrusion P may be interposed between two adjacent secondary batteries 110, particularly between sealing portions of two secondary batteries 110. In particular, two adjacent secondary batteries 110 may be adhered to the protrusion P by means of the adhesive B.

In addition, referring to FIG. 4, the cartridge 120 may have a protrusion P formed at a center portion of the lower surface of the upper unit frame to protrude downwards. In addition, the protrusion P may be interposed between sealing portions S of two adjacent secondary batteries 110 and adhered to the outer circumferences of two secondary batteries 110.

In particular, the protrusion may have a width gradually decreasing in an inner direction, namely in a direction toward the center of the battery pack. For example, as shown in FIG. 3, the protrusion formed at the lower unit frame of the cartridge 120 has an upper portion with approximately a triangular shape to have a width gradually decreasing in an upper direction. In addition, at this time, two inclined surfaces E may be formed at right and left sides at the top of the protrusion, respectively. In addition, the protrusion may be configured to have no region parallel to the ground. In addition, as shown in FIG. 4, the protrusion formed at the upper unit frame of the cartridge 120 may have a lower portion with approximately an inverted triangular shape to have a width gradually decreasing in a lower direction. In addition, at this time, two inclined surfaces E may be formed at right and left sides at the bottom of the protrusion, respectively.

In this embodiment of the present disclosure, the secondary battery 110 and the cartridge 120 may be coupled to each other more closely. For example, when the secondary battery 110 is placed on the upper portion of the cartridge 120, the secondary battery 110 may move downwards along the inclined surface formed at the protrusion of the cartridge 120. In addition, by doing so, the secondary battery 110 may be configured to approach cartridge 120 as much as possible. Therefore, in this embodiment of the present disclosure, by decreasing a distance between the secondary battery 110 and the cartridge 120, it is possible to improve cooling performance, reduce an amount of adhesive used, and obtain a strong coupling force.

In particular, the inclined surface formed at the end of the protrusion may have a flat shape. In other words, the inclined surface of the protrusion may have a planar shape, rather than a curved shape, so that the secondary battery 110 may move upwards or downwards as much as possible along the inclined surface of the protrusion of the cartridge 120. Therefore, in this configuration of the present disclosure, since the secondary battery 110 is adhered to the cartridge 120 as close as possible, it is possible to enhance cooling performance and reduce a volume of the module assembly 100.

Also preferably, the sealing portion of the secondary battery 110 may be folded and then adhered to the cartridge 120.

For example, as shown in FIG. 3, the lower sealing portion S of the secondary battery 110 may be folded at least once in an upper direction, namely toward the accommodation space of the electrode assembly. In addition, in this case, the folded lower sealing portion S and the lower unit frame of the cartridge 120 may be adhered to each other by means of the adhesive B.

In addition, as shown in FIG. 4, the upper sealing portion S of the secondary battery 110 may be folded at least once in a lower direction. In addition, in this case, the folded upper sealing portion S and the upper unit frame of the cartridge 120 may be adhered to each other by means of the adhesive B.

In this configuration of the present disclosure, by reducing a space occupied by the sealing portion, the battery pack may be more easily designed in a smaller size. In addition, since a distance between the secondary battery 110 and the cartridge 120 decreases, heat transfer efficiency from the secondary battery 110 to the cartridge 120 may be improved. In particular, since the adhesive B may be located at an inner and/or outer side of the folded sealing portion S and also an air layer may be removed, the heat in the secondary battery 110 may also be easily transferred to the cartridge 120 through the folded region of the sealing portion S.

In addition, the adhesive B for adhering the secondary battery 110 and the cartridge 120 to each other may be a thermally-conductive adhesive.

Since such a thermally-conductive adhesive has a high heat conduction rate in comparison to general adhesives, it is possible to further enhance a heat transfer amount and a heat transfer rate between the secondary battery 110 and the cartridge 120. Therefore, in this embodiment of the present disclosure, the heat of the secondary battery 110 may be discharged through the cartridge 120 more efficiently, thereby improving the cooling performance of the battery pack.

Meanwhile, in the battery pack according to the present disclosure, the pack case 200 may have an uneven portion formed at an outer surface thereof.

For example, as indicated by "D" in FIGS. 2 and 3, the lower case 220 may have an uneven portion formed at a lower surface thereof by providing convex portions and concave portions alternately. In addition, as indicated by "D" in FIGS. 2 and 4, the upper case 210 may have an uneven portion formed at an upper surface thereof by providing convex portions and concave portions alternately.

In this configuration of the present disclosure, since an outer surface area of the pack case 200 increases due to the uneven portion D formed at the outer surface of the pack case 200, heat discharging performance may be improved. In particular, in an embodiment of the present disclosure, the upper surface and/or lower surface of the module assembly 100 may come into contact with the inner side of the pack case 200 so that the heat of the module assembly 100 may be conducted upwards or downwards through the pack case 200 and emitted outwards. Therefore, if the uneven portion D is formed at both the upper and lower outer surfaces of the pack case 200, the heat discharging performance may be more easily accomplished.

Also preferably, the battery pack according to the present disclosure may further include a thermal pad 300.

As shown in the figures, the thermal pad 300 may be interposed between the module assembly 100 and the pack case 200. In addition, the thermal pad 300 may be made of thermally-conductive material to transfer heat between the module assembly 100 and the pack case 200.

For example, the thermal pad 300 may be interposed between the lower surface of the module assembly 100 and the upper surface of the lower case 220 to transfer the heat of the module assembly 100 toward the lower case 220. In addition, the thermal pad 300 may be interposed between the upper surface of the module assembly 100 and the lower surface of the upper case 210 to transfer the heat of the module assembly 100 toward the upper case 210.

In particular, the thermal pad 300 may be fixed in contact with the module assembly 100 and/or the pack case 200 by means of an adhesive. In this embodiment of the present disclosure, it is possible to prevent the thermal pad 300 and/or the pack case 200 from being shaken inside the pack case 200, and remove or reduce an air layer between the thermal pad 300 and the module assembly 100 and/or between the thermal pad 300 and the pack case 200 so that heat transfer efficiency is enhanced between them.

In addition, the thermal pad 300 may include an elastic body. For example, the thermal pad 300 may be made of elastic material as a whole. In this configuration of the present disclosure, adhesion between the thermal pad 300 and the module assembly 100 and/or between the thermal pad 300 and the pack case 200 may be reinforced to enhance heat transfer efficiency between them. In addition, when an impact is applied to the battery pack, the thermal pad 300 may absorb the impact to prevent the module assembly 100 from being damaged.

Meanwhile, the battery pack according to the present disclosure may further include other components than the above. For example, the battery pack may include electronic parts such as a battery management system (BMS), a current sensor, a relay, a fuse or the like.

Here, the BMS means a battery management device for controlling overall charging/discharging operations of the battery pack, and the BMS is commonly included in a battery pack. In addition, the current sensor is a component for sensing a charging/discharging current of the battery pack, and the relay is a switching unit for selectively opening or closing a charging/discharging path on which a charging/discharging current of the battery pack flows. In addition, the fuse is a component provided on the charging/discharging path of the battery pack so as to be fused off when an abnormal situation occurs at the battery pack to block the flow of charging/discharging current. The current sensor, the relay and the fuse may exchange data with the BMS and be controlled by the BMS.

In addition, the battery pack according to the present disclosure may further include a bus bar for transmitting a charging/discharging power of the module assembly 100, a cable for transmitting an electric signal or the like.

The battery pack according to the present disclosure may be applied to a vehicle such as an electric vehicle or a hybrid electric vehicle. In other words, the vehicle according to the present disclosure may include the battery pack as described above. In particular, in case of a vehicle such as an electric vehicle which obtains a driving force from a battery, the cooling performance, the small and light design of the battery module or the like are very important factors. Therefore, if the battery pack according to the present disclosure is applied to such a vehicle, it is possible to provide a stable and safe battery pack of a small and light design with effective cooling performance.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or a shape in which an object is placed.

What is claimed is:

1. A battery pack, comprising:
a module assembly including a plurality of secondary batteries, and a plurality of cartridges configured to be stacked with each other and surround an outer circumference of the secondary batteries at an outer side, the plurality of cartridges being at least partially made of thermally-conductive material; and
a pack case having an empty space therein to accommodate the module assembly and at least partially made of thermally-conductive material to discharge heat of the module assembly wherein the cartridge has a tetragonal ring shape to accommodate the secondary battery in an inner space thereof, and at least a part of an outer circumference of the secondary battery is adhered to an inner surface of the cartridge by an adhesive.

2. The battery pack according to claim 1,
wherein the pack case is made of metal material.

3. The battery pack according to claim 2,
wherein the pack case is an aluminum die-casting product.

4. The battery pack according to claim 1,
wherein the module assembly has upper and lower portions which come into contact with an inner side of the pack case.

5. The battery pack according to claim 1,
wherein the plurality of secondary batteries and the plurality of cartridges are arranged and stacked in a horizontal direction in a state of standing in a vertical direction.

6. The battery pack according to claim 1,
wherein at least a part of the cartridge includes a thermally-conductive polymer or includes a thermally-conductive material containing thermally-conductive filler and polymer.

7. The battery pack according to claim 1,
wherein two different secondary batteries are adhered to a single cartridge.

8. The battery pack according to claim 7,
wherein the cartridge has a protrusion protruding inwards at an inner side thereof to be interposed between two secondary batteries, and the two secondary batteries are adhered to the protrusion.

9. The battery pack according to claim 8,
wherein the protrusion has inclined surfaces respectively formed at right and left sides thereto to have a width gradually decreasing in an inner direction.

10. The battery pack according to claim 1,
wherein the secondary battery is adhered to the cartridge in a state where a sealing portion of the secondary battery is folded.

11. The battery pack according to claim 1,
wherein the adhesive is a thermally-conductive adhesive.

12. The battery pack according to claim 1, further comprising:
a thermal pad interposed between the module assembly and the pack case.

13. The battery pack according to claim 1,
wherein the pack case has an uneven portion formed at an outer surface thereof.

14. A vehicle, comprising the battery pack according to claim 1.

* * * * *